United States Patent [19]

Buckley et al.

[11] Patent Number: 5,123,616
[45] Date of Patent: Jun. 23, 1992

[54] HIGH EFFICIENCY, LOW WEIGHT AND VOLUME ENERGY ABSORBENT SEAM

[75] Inventors: James A. Buckley; Elsa J. Hennings, both of Ridgecrest, Calif.

[73] Assignee: The United States of America as represented by the Secretary of the Navy, Washington, D.C.

[21] Appl. No.: 758,919

[22] Filed: Sep. 9, 1991

[51] Int. Cl.$^5$ ............................................. B64D 17/10
[52] U.S. Cl. .................................... 244/145; 112/417
[58] Field of Search ...................... 244/142, 145, 126; 112/417, 418

[56] References Cited

U.S. PATENT DOCUMENTS

| | | | |
|---|---|---|---|
| 3,240,451 | 3/1966 | Sepp, Jr. ............................ | 244/145 |
| 3,350,040 | 10/1967 | Simms et al. ...................... | 244/145 |
| 3,429,532 | 2/1969 | Sepp .................................. | 244/145 X |
| 3,452,951 | 7/1969 | Wilson .............................. | 244/145 |
| 3,856,240 | 3/1974 | Forbis ............................... | 244/142 |
| 4,117,993 | 10/1978 | Palm et al. ........................ | 244/145 |
| 4,343,448 | 8/1982 | Johnson ............................ | 244/145 |
| 4,390,149 | 6/1983 | Barnes et al. ..................... | 244/145 |
| 4,637,330 | 1/1987 | Shewmon .......................... | 112/417 |

OTHER PUBLICATIONS

Dan Poynter, The Parachute Manual, 1984 pp. 474, 481-483.
Federal Standard (FED.STD) No. 751a, Jan. 25, 1965 Parts I and II.
E. G. Ewing, H. W. Bixby, T. W. Knacke, Recovery System Design Guide, Dec. 1978 pp. 95-96, 181-186.

Primary Examiner—Joseph F. Peters, Jr.
Assistant Examiner—Carla Mattix
Attorney, Agent, or Firm—Melvin J. Sliwka; John L. Forrest, Jr.

[57] ABSTRACT

A parachute canopy seam joint for fastening a ribbon seam and a radial seam of a parachute canopy together. This parachute canopy seam joint combines a ribbon seam using a zigzag stitch pattern and narrow strips of radial tape sewn together with multiple rows of a straight stitch pattern. The ribbon seam attaches two overlapping ribbons within the parachute. The narrow strips of radial tape shroud the ribbon seam which result in a high strength and low weight and volume radial seam and seam joint. This new configuration of a parachute seam joint has distinct advantages in terms of strength and shock absorbing capacity. Specifically, this new parachute seam joint has a seam strength equal to or greater than the minimum rated strength of the adjoining materials and employs a smaller weight and volume of material than conventional radial seams and seam joints.

10 Claims, 2 Drawing Sheets

HIGH EFFICIENCY, LOW WEIGHT AND VOLUME ENERGY ABSORBENT SEAM

BACKGROUND OF THE INVENTION

The present invention relates to parachute canopies and more particularly to ribbon parachute seam joints for joining a ribbon seam and a radial seam of a ribbon parachute canopy together Further, the present invention addresses the problem of seam strengthening.

A ribbon parachute is a very strong and very stable type of parachute. It functions well at supersonic speeds as well as transitional and subsonic speeds. The parachute consists of a canopy, suspension lines, and risers. The canopy is the cloth or other similar portion of the parachute. Seams are generally considered part of the canopy. Specifically, a ribbon parachute canopy has ribbons, seams, and radial tape. The purpose of the ribbons is to generate drag forces on the parachute. The ribbons also function to transfer these drag forces to the radial tape. The radial tape provides the framework for the canopy and is a primary load transferring member of the canopy. The radial tape transfers radial and circumferential canopy forces to the parachute suspension lines. The seam joints of the present invention are the place where the ribbons and radial tape are joined so as to accomplish the transfer of radial and circumferential forces from the ribbons to the radial tape. Cloth parachutes, unlike ribbon parachutes, have a continuous canopy and therefore do not have seam joints per se but rather have traditional seams which accomplish the transfer of forces.

Parachute seams and seam joints are typically the weakest part of the parachute. Present seams and seam joints maintain a strength of 75% to 90% of the minimum rated strength of the materials joined This translates to a seam efficiency of 0.75 to 0.90 respectively. Seam efficiency is often dependent on the properties and volume of material used in the fabrication of the seam. Typically, the greater volume used in the fabrication process of the seam, the greater the seam efficiency. Excess volume and hence weight, however, present additional problems to those involved in parachute design. The excess weight and volume of material increases the overall weight and volume of the parachute usually resulting in a decrease in available payload space which is of critical importance.

If the seam and seam joints possess a strength less than that of the materials being joined, this may result in seam yielding under normal stress loads and occasionally catastrophic seam failure under high load exposure. There is a continuing need to improve the strength of the seams and seam joints relative to the materials being joined and to improve the shock absorbing capacity of the seams. This improvement in seam strength must be accomplished while using a relatively small volume of material in fabricating the seam.

Prior art in this field involves numerous configurations of seams involving a variety of stitching patterns. (See FED-STD. No. 751). FED-STD. No. 751 is incorporated by reference herein In addition, the positioning of existing tape material to add reinforcement to the seam is a generally accepted design practice. In fact, ribbon parachute radial seams commonly consist of two strips of two inch wide radial tape attached to the ribbons with eight rows of straight stitching along the length of the strips of tape.

The present invention, however, provides unique configurations of a ribbon parachute seam and seam joint which combines a ribbon seam using a zigzag stitch pattern and narrow strips of radial tape sewn together with multiple rows of a straight stitch pattern. The ribbon seam attaches two parallel and narrowly overlapping ribbons within the parachute. The narrow strips of radial tape enclose the ribbon seam which results in a high strength and low volume radial seam and seam joint. This new configuration of a ribbon parachute seam has distinct advantages in terms of strength and shock absorbing capacity. Specifically, this new parachute seam has a seam strength equal to or greater than the minimum rated strength of the adjoining materials and employs a smaller weight and volume of material than conventional ribbon parachute radial seams.

SUMMARY OF THE INVENTION

The present invention is a ribbon parachute seam joint for fastening a ribbon seam and a radial seam of a parachute canopy together. The present invention can be used on a variety of parachute applications including personnel, missile, drone, and cargo chutes. This seam also has numerous uses in other high strength stitching applications.

The parachute seam joint is constructed by joining a ribbon seam having a zigzag stitch pattern with a radial seam having narrow strips of radial tape and multiple rows of straight stitching. The presence of the ribbon seam and the means for combining or joining the ribbon seam with the radial seam are the key aspects of this invention. The present invention comprises a ribbon seam, a radial seam including two narrow strips of radial tape, and a means of joining the two seams so that the strength of the seam is equal to or exceeds the minimum rated strength of the materials joined and the weight and volume of material used to fabricate the seam is small relative to the seam efficiency.

The ribbon seam is first constructed by fastening together overlapping parachute ribbons with two parallel rows of zigzag stitching along the overlapped sections of ribbon. The radial seam is then fabricated in a manner that shrouds or orthogonally sandwiches the ribbon seam. The radial seam includes two narrow strips of radial tape placed above and below the ribbon seam and oriented along the longitudinal axis such that the tape strips cover the zigzag stitch pattern. The narrow strips of radial tape are attached to the overlapping portions of ribbons with four parallel rows of straight stitch also oriented along the longitudinal axis and on the radial tape so as to affix the radial tape to the parachute ribbons as well as to the other strip of radial tape.

It is an object of this invention to provide a parachute seam joint that is capable of withstanding repetitive high load use.

It is another object of this invention to provide a parachute seam joint that is equal to or greater than the minimum rated strength of the materials being joined.

It is yet another object of this invention to provide a parachute seam joint that is capable of absorbing shock without compromising the strength of the seam.

It is yet another object of this invention to provide a parachute seam joint that has a weight and volume of material that is small in relation to the seam efficiency. Seam efficiency can be expressed as the ratio of the seam strength to the minimum rated strength of the materials being joined.

A feature of this invention is the use of multiple rows of zigzag stitching as the ribbon seam. The zigzag stitching tends to elongate in the direction of a load. Since the joint is subject to repetitive loads in multiple directions, the stitch elongation may occur in various directions. Although, the radial seam represents the primary load transferring member to the suspension lines, the ribbon seam acts to transfer the drag force to the radial seam absorbing the initial shock loading which reduces the likelihood of catastrophic seam failure.

Another feature of this invention is the use of two narrow strips of radial tape above and below the ribbon seam and aligned therewith. The narrow strips of radial tape are secured in place with multiple rows of straight stitching thus forming the radial seam. The strips of radial tape and the straight stitching are the primary load transferring members in this joint and act to improve the overall strength of the seam with minimal weight and volume and still provide protection against seam yielding under repetitive high load uses.

The present invention satisfies the aforementioned objectives and incorporates the preceding features in a manner that is apparent from consideration of the drawings and the detailed description of the invention.

DETAILED DESCRIPTION

Figure 1:
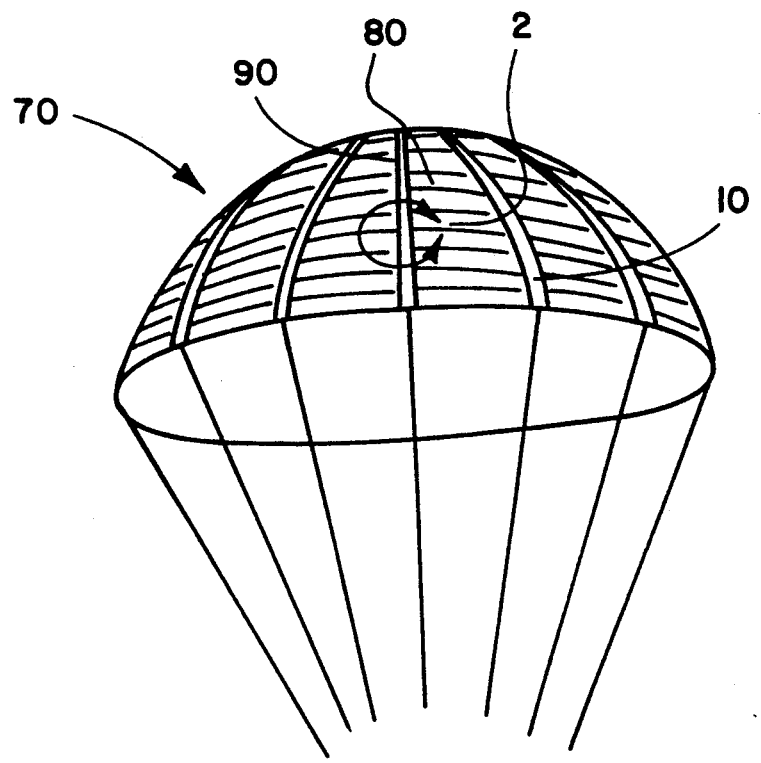
FIG. 1 is a perspective view of a ribbon parachute canopy.

FIG. 1 shows a typical deployment of a ribbon parachute (70). The present invention is a ribbon parachute seam joint (10) for fastening a ribbon seam (80) and a radial seam (90) of a ribbon parachute canopy (70) together. This seam joint, however, can be used on a variety of parachute applications. This seam joint also has numerous uses in other high strength stitching applications.

Figure 2:
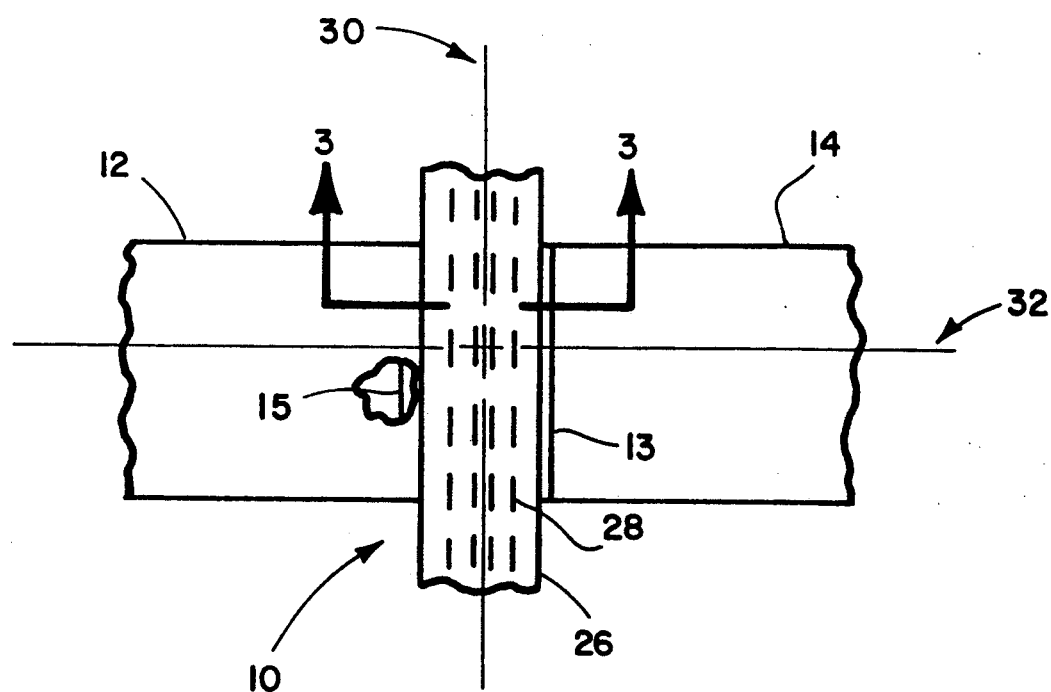
FIG. 2 is a top plan view of the ribbon parachute canopy seam joint with the parachute ribbons aligned in the edge to edge position taken along line 2—2 of FIG. 1.
Figure 3:
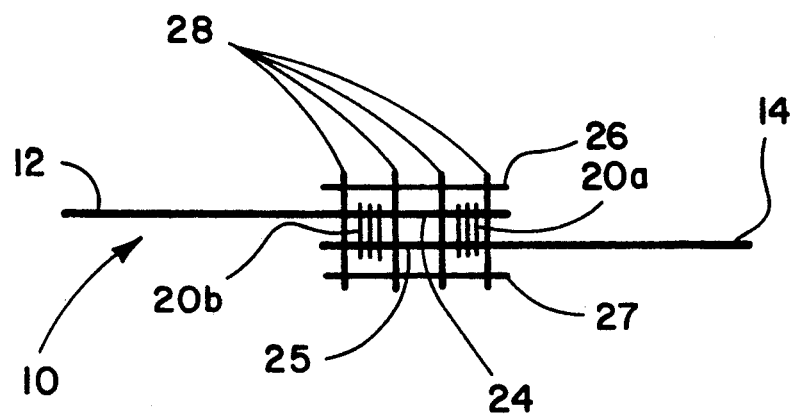
FIG. 3 is a cross section view of the ribbon parachute canopy seam joint taken along line 3—3 of FIG. 2.
Figure 4:
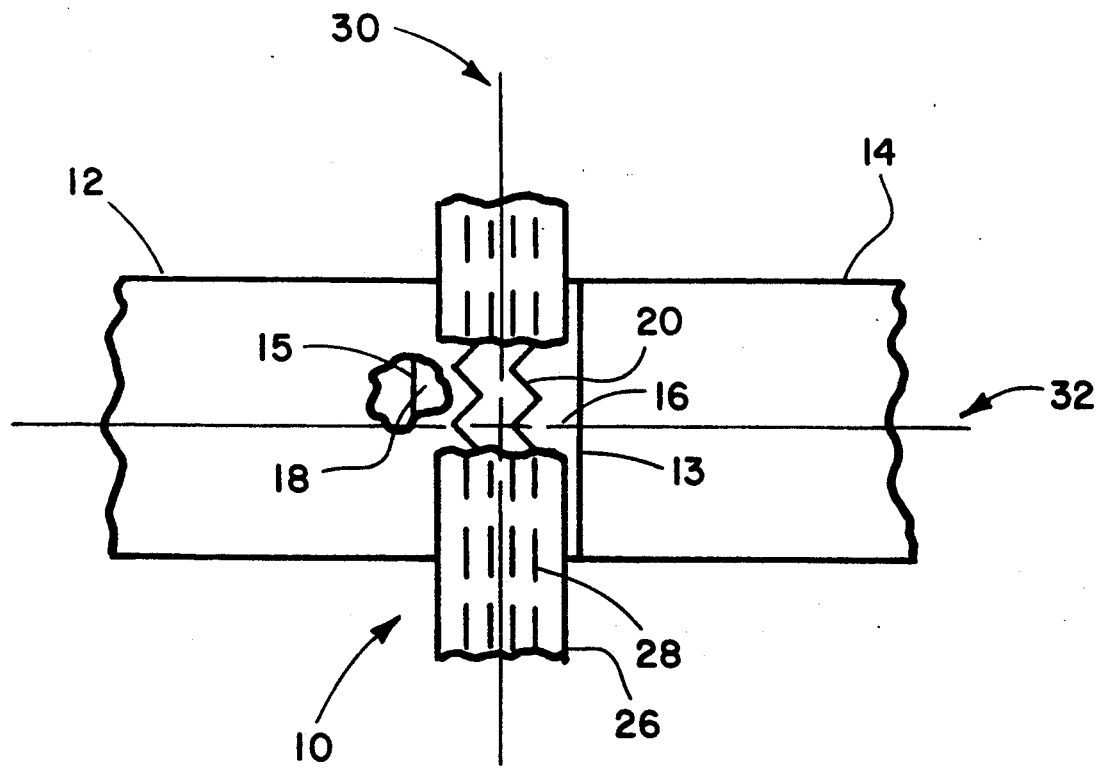
FIG. 4 is partial breakaway view of the ribbon parachute canopy seam joint of FIG. 2 showing the underlying zigzag stitch.

FIG. 2, FIG. 3, and FIG. 4 show the present invention as two parachute ribbons (12,14) in the edge to edge positions. For purposes of describing the present invention it is best to identify a longitudinal axis (30) and a lateral axis (32). The dimensions of the elements that comprise the present invention can best be described in terms of a lengthwise dimension, a crosswise dimension, a width, and a thickness. The lengthwise dimension is that dimension that is measured along the identified longitudinal axis (30). The crosswise dimension of the parachute ribbons (12,14) is that dimension that is measured along the identified lateral axis (32) of the parachute ribbons. References made to the width of the radial tape (26,27) or the overlapping sections (16,18) are also measured along the identified lateral axis (32). Finally, references to the thickness of various elements are measured along a third unidentified axis perpendicular to both the longitudinal and lateral axes Referring back to FIGS. 2–4, the two parachute ribbons (12,14) are aligned with the right edge (13) of the first parachute ribbon (12) slightly overlapping the left edge (15) of the second parachute ribbon (14). This creates two overlapping sections (16,18). The parachute ribbons (12,14) used in the present invention are strips of nylon or other suitable parachute material such as rayon or cloth.

The overlapping sections (16,18) of the two parachute ribbons (12,14) are sewn together using a zigzag stitch pattern (20) oriented along the longitudinal axis (30). The preferred embodiment of the invention uses two rows of zigzag stitch (20a,20b) oriented along the longitudinal axis (30) which are substantially parallel to each other along the stitch axes. Stitch pattern No. 308 is the preferred stitch. (Refer to FED-STD. No. 751). This element of the present invention is referred to as the ribbon seam (80). This seam acts to absorb shock and reduce the likelihood of catastrophic sea failure due to the ability of the zigzag stitch to elongate in the direction of a specific load. The ribbon seam (80) defines two surfaces which are the ribbon seam upper surface (24) and a ribbon seam lower surface (25).

Two strips of radial tape (26,27) are placed over the zigzag stitch pattern (20). The first piece of radial tape (26) is located on top of the zigzag stitch pattern (20) on the upper surface of the ribbon seam (80). The second piece of radial tape (27) is located just underneath the overlapping sections (16,18) of parachute ribbons on the lower surface of the ribbon seam (80). Both strips of radial tape (26,27) have a width approximately equal to and no greater than the width of the overlapping sections (16,18) of parachute ribbons as measured along the lateral axis (32) of the seam. In the preferred embodiment of the present invention, the width of the radial strips of tape (26,27) is approximately one inch measured along the lateral axis (32) of the seam configuration. This represents a reduction in seam volume of approximately 35% over conventional radial seams and a reduction in seam weight of approximately 25%. In addition, both strips of radial tape (26,27) are oriented along the longitudinal axis (30) so as to completely cover the zigzag stitch pattern (20) from the top as well as from underneath. In the preferred embodiment, nylon strips of radial tape were used. Numerous alternative tape materials can be substituted for the nylon tape material in the preferred embodiment. Such substitution would be an obvious variation to those skilled in the art. The strips of radial tape (26,27) are secured in place by sewing the first strip of radial tape (26) to the overlapping sections (16,18) of the parachute ribbons as well as to the second strip of radial tape (27). The present invention utilizes multiple rows of straight stitching (28) aligned along the longitudinal axis (30) and on the strips of radial tape (26,27). Specifically, the preferred embodiment of this invention uses four rows of straight stitching (28) to attach the two strips of radial tape (26,27) in place and complete the parachute seam joint (10). Alternate means of securing the strips of radial tape (26,27) to the overlapping sections (16,18) can be employed, including a variety of stitch patterns. Stitch pattern No. 301 (Refer to FED-STD No. 751) is the preferred stitch.

The purpose of positioning the two strips of radial tape (26,27) and the four rows of straight stitching (28), which comprise the radial seam (90) at the ribbon seam, is to improve the overall strength of the parachute seam joint (10) and to provide protection against seam yielding under repetitive high load uses.

Two essential aspects of the present invention are the improved seam efficiency and a relatively small seam joint weight and volume. Seam efficiency can be expressed a the ratio of the seam strength to the minimum rated strength of the materials being joined.

In a prototype design of the present invention, nylon radial tape strips (26,27) having a thickness of 0.030 inches, a weight ratio of 0.5 ounces per yard, and a width of approximately 1.0 inches was used. The ribbon material was also made of nylon and was 0.020 inches thick, two inches wide, and had a weight ratio of one pound per 30 yards. The overlapping sections (16,18) of ribbon material were approximately 1.0 inches in width as measured along the lateral axis (32) of the seam joint. The two rows of zigzag stitch (20) used were FED-STD 751 Type 308 stitch and the four rows of straight stitch (28) were FED-STD 751 Type 301 stitch. FED-STD No. 751 is incorporated by reference in this specification. This prototype resulted in a radial seam volume of 4.39 cubic inches and a radial seam weight of 0.12 pounds. Since the radial seam length, as measured along the longitudinal axis (30) of the present invention, is approximately 51 inches, the seam volume to seam length ratio is 0.086 inches squared. Further, the weight to length ratio is 0.002 pounds per inch. Early test results demonstrated an average seam tensile strength of 1024 lbs. The nylon material used was rated at 1000 lbs minimum tensile strength.

By way of comparison to conventional ribbon parachute seam joints, the conventional seam joints demonstrated an average seam tensile strength of only 730 lbs. Further, a conventional radial seam for the same gore configuration as was analyzed in the above embodiment of present invention resulted in a radial seam volume of 6.7 cubic inches and a weight of 0.155 pounds. The conventional seam uses two inch wide ribbon for radial tape with two inches of overlap in the ribbons. Since the radial seam length is the same as in the present invention, the volume to length ratio is 0.131 inches squared and the weight to length ratio is 0.003 pounds per inch. Thus the present invention results in a seam volume reduction of approximately 35% and a weight reduction of approximately 25% per radial seam and an increase in strength of approximately 40% over the prior art in the field of ribbon parachute seams. Thus, the present seam demonstrated a seam efficiency greater than 1.00 while maintaining a relatively small seam joint volume.

It is apparent from the consideration of the teachings herein, that the present invention, although preferably used in a ribbon parachute canopy can be used in a variety of parachute applications including the traditional cloth parachutes. The present invention also has further uses in other high strength stitching applications not involving parachutes.

A preferred method of constructing a single ribbon parachute seam joint (10) of the present invention includes performing the following steps;

(a) aligning a first nylon parachute ribbon (12) having a thickness of 0.020 inches with a second nylon parachute ribbon (14) also having a thickness of 0.020 inches, such that the edge (13) of the first parachute ribbon (12) is generally parallel to and narrowly overlapping the edge (15) of the second parachute ribbon (14) by approximately 1.00 inches;

(b) sewing two rows of generally parallel zigzag stitching (20), preferably FED-STD 751 Type 308 stitch, on the approximately 1.00 inch of overlapping sections (16,18) of parachute ribbons so that they are fastened together; (c) placing a first narrow strip of nylon radial tape (26), having a thickness of 0.030 inches and a width of approximately 1.00 inches, on top of the overlapping sections (16,18) of ribbons and oriented along the longitudinal axis (30) so as to cover the zigzag stitch pattern (20);

(d) placing a second narrow strip of radial tape (27), having a thickness of 0.030 inches and a width of approximately 1.00 inches, underneath the overlapping sections (16,18) of ribbons and also oriented along the longitudinal axis (30) so as to further cover the zigzag stitch pattern from underneath (20); and (e) sewing the two strips of radial tape (26,27) together with four rows of straight stitching (28), preferably FED-STD 751 Type 301 stitch, so that the overlapping sections (16,18) of the sandwiched parachute ribbons are affixed to the strips of radial tape (26,27).

It is understood that many of the steps identified above may be varied in terms of the materials used, the number, orientation, and dimensions of the materials, the stitch patterns used, or other distinguishing characteristics. Further, it is possible to vary the aforementioned method by constructing multiple seam joints concurrently, or by adapting this method to uses on other parachute applications Such variations are intended to be covered by the teachings contained within this disclosure

What I claim as the invention is:

1. A high efficiency, low weight and volume energy absorbent ribbon parachute canopy seam joint comprising;

a ribbon seam comprising two generally parallel and overlapping parachute ribbons fastened to each other thereby defining an overlapping section, said ribbon seam further defining a longitudinal axis and a lateral axis;

a radial seam comprising two generally parallel strips of radial tape orthogonally disposed and sandwiching said parachute ribbons at said overlapping section; and a means for joining said radial seam with said ribbon seam such that said parachute seam joint has a seam efficiency greater than 1.00, a radial seam volume to length ratio less than 0.10 inches squared, and a radial seam weight to length ratio less than 0.0025 pounds per inch.

2. A ribbon parachute canopy seam joint as described in claim 1 wherein said means for joining said radial seam with said ribbon seam comprise a construction of said radial seam so that said radial seam is affixed to and orthogonally sandwiching said ribbon seam.

3. A ribbon parachute canopy seam joint as described in claim 1 wherein said ribbon seam further comprises;

a first parachute ribbon having a lengthwise dimension measured along said longitudinal axis, also having a crosswise dimension measured along said lateral axis, and further having an edge of lengthwise dimension;

a second parachute ribbon having a lengthwise dimension measured along said longitudinal axis, also having a crosswise dimension measured along said lateral axis, and further having an edge of lengthwise dimension, said second parachute ribbon disposed on said first parachute ribbon such that said edge of said first parachute ribbon is generally parallel to s id edge of said second parachute ribbon, and thus defining a narrow overlapping section; and a plurality of rows of zigzag stitch disposed along said longitudinal axis and on said narrow overlapping section whereby said first and second parachute ribbons are fastened together.

4. A ribbon parachute canopy seam joint as described in claim 3 wherein said rows of zigzag stitching are parallel and spaced equidistant from each other and from said edges of said ribbons.

5. A ribbon parachute canopy seam joint as described in claim wherein said parachute ribbons are nylon ribbons.

6. A ribbon parachute canopy seam joint as described in claim 1 wherein said parachute radial seam comprises;

a first strip of radial tape, having a lengthwise dimension, disposed on said ribbon seam such that said lengthwise dimension is oriented along said longitudinal axis of said ribbon seam;

a second strip of radial tape, having a lengthwise dimension, disposed on said ribbon seam opposite said first strip of radial tape and such that said lengthwise dimension is also oriented along said longitudinal axis of said ribbon seam; and a means for affixing said first strip of radial tape to said second strip of radial tape thereby affixing said radial seam to said ribbon seam such that said radial seam orthogonally sandwiches said parachute ribbons.

7. A ribbon parachute canopy seam joint as described in claim 6 wherein said strips of radial tape are one inch wide strips of nylon radial tape.

8. A ribbon parachute canopy seam joint as described in claim 6 wherein said means for affixing said first strip of radial tape to said second strip of radial tape thereby affixing said radial seam to said ribbon seam comprises sewing four rows of straight stitch oriented along said longitudinal axis and on said first and second strips of radial tape.

9. A method of constructing a ribbon parachute canopy seam joint for fastening ribbons of a parachute together such that said parachute seam joint has a seam efficiency greater than 1.00, a radial seam volume to seam length ratio less than 0.10 inches squared, and a radial seam weight to seam length ratio less than 0.0025 pounds per inch, comprising the steps of;

aligning a first parachute ribbon having an edge with a second parachute ribbon also having an edge, such that said edge of said first parachute ribbon is generally parallel to and narrowly overlapping said edge of said second parachute ribbon, and said ribbons define a longitudinal axis and a lateral axis;

sewing a plurality of rows of zigzag stitching along said longitudinal axis on said narrow overlapping sections of ribbons whereby said first and second parachute ribbons are fastened together;

placing a first narrow strip of radial tape, having a lengthwise dimension, on said overlapping sections of ribbons and oriented such that said lengthwise dimension is aligned along said longitudinal axis so as to cover said zigzag stitch;

placing a second narrow strip of radial tape, having a lengthwise dimension, on said overlapping sections of ribbons and opposite to said first narrow strip of tape and oriented such that said lengthwise dimension is aligned along said longitudinal axis so a to further cover said zigzag stitch; and sewing said first strip of radial tape to said second strip of radial tape with multiple rows of straight stitching thereby affixing and orthogonally sandwiching said overlapping sections of said parachute ribbons to said first and second strips of radial tape.

10. A method of constructing a ribbon parachute canopy seam joints for fastening ribbons of a parachute together such that said parachute seam joints have a seam efficiency greater than 1.00, a seam volume to seam length ratio less than 0.10 inches squared, and a radial seam weight to seam length ratio less than 0.0025 pounds per inch, comprising the steps of;

aligning a first pair of parachute ribbons having a first pair of edges, such that said first pair of edges of said first pair of parachute ribbons are generally parallel and narrowly overlapping and said first pair of ribbons define a longitudinal axis and a lateral axis;

sewing a plurality of rows of generally parallel zigzag stitching on said narrow overlapping sections of parachute ribbons along said longitudinal axis whereby said first pair of parachute ribbons are fastened together;

aligning multiple successive pairs of parachute ribbons each successive pair having a pair of edges, such that said each successive pair of edges are generally parallel and narrowly overlapping and said successive pairs of ribbons have a longitudinal axis and a lateral axis;

sewing a plurality of rows of generally parallel zigzag stitching on said narrow overlapping sections of each successive pair of parachute ribbons along said longitudinal axis whereby each said successive pair of parachute ribbons are fastened together;

aligning said first pair of said parachute ribbons and said successive multiple successive pairs of parachute ribbons together such that said zigzag stitches of each said pair of parachute ribbons are generally arranged in a straight line along said longitudinal axes;

placing a first narrow strip of radial tape, having a lengthwise dimension, on said overlapping sections of ribbons and disposed such that said lengthwise dimension is aligned along said longitudinal axis so as to cover said arranged zigzag stitching;

placing a second narrow strip of radial tape, having a lengthwise dimension, on said overlapping sections of ribbons and opposite to said first narrow strip of tape and disposed such that said lengthwise dimension is aligned along said longitudinal axis so as to further cover said arranged zigzag stitching; and sewing said first strip of radial tape to said second strip of radial tape with multiple rows of straight stitching thereby affixing and orthogonally sandwiching said parachute ribbons to said first and second strips of radial tape.

* * * * *